(12) United States Patent
Yang

(10) Patent No.: US 7,422,064 B1
(45) Date of Patent: Sep. 9, 2008

(54) HIGH PERFORMANCE FOAMS FOR UNLOADING GAS WELLS

(75) Inventor: Jiang Yang, Missouri City, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/682,044

(22) Filed: Mar. 5, 2007

(51) Int. Cl.
 *E21B 43/26* (2006.01)
(52) U.S. Cl. .................................. 166/309; 166/308.6
(58) Field of Classification Search ........................ None
 See application file for complete search history.

(56) References Cited

U.S. PATENT DOCUMENTS

| 4,676,316 | A | * | 6/1987 | Mitchell ...................... 166/403 |
| 4,703,797 | A | * | 11/1987 | Djabbarah ............... 166/252.1 |
| 5,178,217 | A | | 1/1993 | Mohammadi et al. |
| 5,203,411 | A | | 4/1993 | Dawe et al. |
| 5,246,072 | A | | 9/1993 | Frazier, Jr. et al. |
| 5,358,045 | A | | 10/1994 | Sevigny et al. |
| 5,882,541 | A | | 3/1999 | Achtmann |

OTHER PUBLICATIONS

Samuel Campbell et al., "Corrosion Inhibition/Foamer Combination Treatment to Enhance Gas Production," SPE 67325, pp. 1-9, SPE Production and Operations Symposium, Oklahoma City, OK Mar. 24-27, 2001.

Marek Pakulski et al., "Synergism and Antagonism of Foaming Agents and Corrosion Inhibitors," SPE 65016, pp. 1-7, SPE International Symposium on Oilfield Chemistry, Houston, TX, Feb. 13-16, 2001.

D. Orta et al., "A Novel Foamer for Deliquification of Condensate-Loaded Wells," SPE 107980-PP, pp. 1-5, SPE Rocky Mountain Oil & Gas Technology Symposium, Denver, CO, Apr. 16-18, 2007.

* cited by examiner

*Primary Examiner*—Zakiya W. Bates
(74) *Attorney, Agent, or Firm*—Madan, Mossman & Sriram P.C.

(57) ABSTRACT

Mixtures of at least one nonionic surfactants and at least one ionic surfactant together with a gas create foams to aid the removal of produced hydrocarbon fluids from gas wells and pipelines.

14 Claims, No Drawings

HIGH PERFORMANCE FOAMS FOR UNLOADING GAS WELLS

TECHNICAL FIELD

The invention relates to mixtures of nonionic surfactants and ionic surfactants, and most particularly relates, in one non-limiting embodiment, to methods of using mixtures of nonionic surfactants and ionic surfactants to move liquid loads in gas wells and pipelines.

BACKGROUND

In the recovery of hydrocarbons from subterranean reservoirs, the use of primary production techniques (i.e., use of only the initial formation energy to recover the crude oil), followed by the secondary technique of waterflooding, recovers only about 60 to 70% of the original oil present in the formation. Gas well production systems are generally limited in their production due to the load of oil and water in the flowlines.

In most gas wells, water and/or condensate is produced along with gas. In mature gas wells, decreasing formation pressures and gas velocities gradually cause the wells to become "loaded" with liquids. Because of the difficulties in treating liquid-loaded wells with higher condensate cuts, operators may use a variety of methods to prevent liquid loading in marginal gas wells. These methods include: the use of intermitters; velocity strings; adding additional compressor capacity; and applying chemical foamers.

Intermitters allow for periodic gas flow interruptions that enable the formation to temporarily increase down-hole gas pressure in the reservoir during the shut-in phase. This accumulated pressure provides sufficient gas velocity to unload liquids from the well when opened. This continues until the actual gas velocities decrease below the critical velocities where loading occurs. A disadvantage of this type of production method is the loss of gas (and condensate) production during the "off" periods.

Velocity strings are inserted tubing strings that are narrower than the existing tubing (typically a wide capillary string) that enable the user to physically increase the linear velocity of the gas and, in turn, prevent liquid loading. A disadvantage of this type of production method is the possible loss of production, due to the restriction the string creates.

Added compression capacity reduces the overall wellhead pressure and thus increases the differential pressure with the down-hole pressure. This removes gas back-pressure restrictions that are conducive to liquid loading. A disadvantage of this option is the large capital expenditure required to add compressors.

A method commonly used to deliquify these wells is through the application of chemical "foamers". However, these traditional foamers tend to be ineffective as the condensate-to-water ratio increases. During underbalanced drilling, the drilling fluid may be mixed with other materials, such as nitrogen, air, carbon dioxide, air-filled balls and other additives to control the drilling fluid density or the equivalent circulating density and to create foam in the drilling fluid to provide gas lift downhole.

The gases which are commonly employed in gas-drive methods include for example, nitrogen, carbon dioxide, methane, mixtures of methane with ethane, propane, butane, and higher hydrocarbon homologues. This class of gases includes both natural gas and produced gas.

Further, it has been found that recovering gas and other fluids from gas wells and pipelines using foams is different from using foams to recover oil from subterranean formations. It cannot be assumed that a composition used in one method would necessarily work in a different method.

Further, the use of certain other techniques is also known within the art. For instance, plunger lift is an artificial-lift method principally used in gas wells to unload relatively small volumes of liquid. An automated system mounted on the wellhead controls the well on an intermittent flow regime. When the well is shut-in, a plunger is dropped down the production string. When the control system opens the well for production, the plunger and a column of fluid are carried up the tubing string. The surface receiving mechanism detects the plunger when it arrives at surface and, through the control system, prepares for the next cycle.

Gas lift techniques have been used to obtain additional production when wells become loaded with fluids. Gas is injected into the production tubing to reduce the hydrostatic pressure of the fluid column. The resulting reduction in bottomhole pressure allows the reservoir liquids to enter the wellbore at a higher flow rate. The injection gas is typically conveyed down the tubing-casing annulus and enters the production train through a series of gas-lift valves. The gas-lift valve position, operating pressures and gas injection rate are determined by specific well conditions.

It would be advantageous if a new foam-forming composition were devised to give improved and more effective liquid unloading of fluids from gas wells and/or pipelines.

SUMMARY

There is provided, in one form, a method of recovering a fluid from a gas well or a pipeline. The method involves at least periodically injecting a foam-forming composition into a well or pipeline. The foam-forming composition includes, but is not necessarily limited to, a gas, at least one nonionic surfactant; and at least one ionic surfactant. The ionic surfactant includes, but is not limited to, anionic surfactants, cationic surfactants and/or amphoteric surfactants. The method further involves creating a foam from foam-forming composition, and then contacting the fluid in the well or pipeline with the foam and the gas to recover the fluid.

DETAILED DESCRIPTION

It has been unexpectedly discovered that foams made from gas, at least one nonionic surfactant and at least one ionic surfactant may help unload gas condensate wells loaded with water and condensate with superior performance. In one non-limiting embodiment, the foaming composition may comprise at least one alcohol ethoxylate and at least one amphoteric/zwitterionic surfactant. The weight ratio of the nonionic proportion (total nonionic proportion if more than one is used) to ionic surfactant proportion (total ionic proportion if more than one is used) may range from about 99/1 to about 1/99. In another non-limiting embodiment, the ratio is from about 90/10 independently up to 10/90.

More specifically, suitable nonionic surfactants include, but are not limited to, alcohol ethoxylates having a straight or branched alkyl chain of from 3 to 18 carbon atoms, and from 1 to 30 ethoxy groups. In another embodiment, the alcohol ethoxylate has from 3 to 12 carbon atoms and independently from 1 to 20 ethoxy groups. The nonionic surfactant herein may also contained propoxy groups as long as a sufficient amount of ethoxy groups were present to meet the requirements of the inventive method.

The ionic surfactants may be anionic, cationic or amphoteric/zwitterionic. Suitable cationic surfactants include, but are not limited to, monoalkyl quaternary amines, of which specific, non-limiting examples include cocotrimonium chloride, cetyltrimonium chloride, stearyltrimonium chloride, soyatrimonium chloride, behentrimonium chloride, and the like and mixtures thereof. Other suitable cationic surfactants include, but are not limited to, dialkyl quaternary amines, specific non-limiting examples of which include dicetyidimethyl ammonium chloride, dicocodimethyl ammonium chloride, distearyidimethyl ammonium chloride, and the like and mixtures thereof.

Suitable anionic surfactants include, but are not limited to, fatty carboxylates, alkyl sarcosinates, alkyl phosphates, alkyl sulfonates, alkyl sulfates, and mixtures thereof;

Suitable amphoteric/zwitterionic surfactants include, but are not limited to, alkyl betaines, alkylamido propyl betaines, alkylampho actetates, alkylamphopropionates, alkylamidopropyl hydroxy sultanes, and mixtures thereof.

Solvents may also be employed with the surfactants, particularly to act as anti-freeze agents. Suitable solvents include, but are not limited to, alcohol or ether derivatives such as methanol, ethanol, isopropanol, ethylene glycol, propylene glycol, methyl ether ethylene glycol, and the like and mixtures thereof.

The foam-forming composition herein may be employed or used in a concentrate or dilute form. The water which may be effectively employed herein for both forming and/or diluting the concentrate may include water from any natural source, including a brine ranging in concentration of dissolved solids up to saturated brine depending on the reservoir temperature and concentrate composition.

The foam-forming compositions herein may optionally also contain minor amounts of other surface active agents. For example, cosurfactants, such as amphoteric surfactants different than the ionic surfactant used, as well as scale inhibitors, such as phosphates, phosphonates, polymers and chelating agents, may be present. The total amount of these additional surface active agents is not greater than about 5% by weight of the other components of the mixture, in one non-limiting embodiment. In an alternate embodiment of the foam-forming compositions herein, the only surfactants present are the nonionic surfactant(s) and the ionic surfactant(s) discussed above.

It is to be understood by those skilled in the art that this composition may be used either in cyclic ("huff and puff") or drive recovery methods under either miscible or immiscible conditions. These embodiments are included by the phrase "at least periodically injecting", which also includes continuously injecting the gas and foam-forming composition. Indeed, one non-limiting preferred manner of practicing the methods herein is through continuous injection of product through capillary tubing. The foam-forming composition may also be introduced into the well by batching the product down the tubing either in a procedure known as batch and fall or by tubing displacement.

The usage level of the foam-forming composition may be from about 10% to about 5 ppm depending on the field conditions which include, but are not limited to, the temperatures and pressures of the formation, the geological characteristics of the formation, the nature and characteristics of the hydrocarbon being recovered and the like.

In using the foam-forming composition for the enhanced recovery of liquids, such as produced fluids (i.e. fluids produced from a well), the foam may either be preformed or formed "in situ" (e.g., through introduction of alternate slugs of gas and form-forming composition in the formation). In either method, any of the procedures recognized in the art for injecting a foam into a formation may be employed and are encompassed herein.

To further illustrate the invention, the compositions and methods herein will be additionally described by way of the following non-limiting Examples, which are intended only to further show specific embodiments of the invention, but not to limit it in any way.

EXAMPLES

Example 1

The foam was generated by bubbling $N_2$ gas through a fret into column of 5×75 cm for 5 minutes. The gas flow rate was 15 ft$^3$/hr (0.42 m$^3$/hr). The foam raised and carried over liquid to container to simulate a gas unloading process. The more liquid/foam carried over (unloaded), the more effective the foamer to remove liquid hold up was. The concentration of the foamer was 2000 ppm in 100 ml liquid. The oil was dodecane. The volume ratio of brine and oil was 95/5. The composition of brine was 4 g/l $Ca_2Cl_2.2H_2O$, 1.86 g/l $MgCl_2.6H_2O$, 94 g/l NaCl. The test was done at 60° C. The Formulas 1 and 3 given were the individual components and their mixed formula was Formula 2. The compositions and results are given in Table I.

TABLE I

| Foamer Composition | Formula 1 | Formula 2 | Formula 3 |
|---|---|---|---|
| Lauryl amido betaine-30% | 50% | 41.4% | |
| Octyl ethoxylates (3)* | | 4.14% | 8% |
| $H_2O$ | 50% | 54.46% | 92% |
| Unloaded liquid/foam | 47 g | 68 g | 0 g |

*(3) = 3 ethoxylate units

It may be seen that mixture of nonionic and amphoteric surfactant gives more liquid unloading than either surfactant used alone or separately (68 g v. 47 g or 0 g). By "more liquid unloading" is meant more fluid is recovered from a well or a pipeline.

Example 2

This test was done at the same condition as Example 1. The oil was dodecane. The ratio of brine and oil was 80/20 (higher hydrocarbon content than Example 1). The test was done at 60° C. The concentration of the foamer was 2000 ppm in 100 ml liquid. The Formula 1 and 3 was the individual component and their mixed formula is formula 2. The compositions and results are given in Table II.

TABLE II

| Foamer Composition | Formula 1 | Formula 2 | Formula 3 |
|---|---|---|---|
| Lauryl amido betaine-30% | 50% | 41.4% | |
| Octyl ethoxylates (3) | | 4.14% | 8% |
| $H_2O$ | 50% | 54.46% | 92% |
| Unloaded liquid/foam | 34 g | 58 g | 0 g |

It can be seen that mixture of nonionic and amphoteric surfactant gives more liquid unloading at the higher hydrocarbon content than either surfactant used alone or separately (58 g v. 34 g or 0 g).

It should be appreciated that the gas well foaming methods herein are different in kind from oil recovery methods and from personal care foams. That is, even if a particular Foam A is better than a particular Foam B in these latter applications, the order could be reversed in the gas well and pipeline methods herein. Removing produced fluids from gas wells is a vertical foam lifting process under extremely high flow rates, e.g. above 40 ft/sec (12 m/sec). In other words, it has been discovered in experiments by the inventor that simply because one combination of surfactants works well in one method does not mean that it works well in a different method, i.e. this is a rather unpredictable art.

Many modifications may be made in the composition and implementation of this invention without departing from the spirit and scope thereof that are defined only in the appended claims. For example, the foam-forming compositions may be different from those explicitly used and described here. Additionally, nonionic surfactants, ionic surfactants and gases other than those specifically mentioned may find utility in the methods and compositions of this method. Various combinations of gases, nonionic surfactants and ionic surfactants, besides those explicitly mentioned herein, and in different proportions than those mentioned herein, are also expected to find use as effective and improved foam-forming compositions in unloading gas wells, pipelines, and the like.

Further, the word "comprising" as used throughout the claims, is to be interpreted to mean "including but not limited to". Similarly, the word "comprises" as used throughout the claims, is to be interpreted to mean "includes but not limited to".

What is claimed is:

1. A method of recovering a fluid from a gas well or a pipeline comprising:
   injecting a foam-forming composition into a well or pipeline, where the foam-forming composition comprises:
      a gas;
      at least one nonionic surfactant; and
      at least one ionic surfactant selected from the group consisting of anionic surfactants, cationic surfactants and amphoteric surfactants;
   creating a foam from the foam-forming composition; and
   contacting the fluid in the well or pipeline with the foam to recover the fluid.

2. The method of claim 1 where the at least one ionic surfactant is selected from only one type of the surfactants selected from the group consisting of anionic surfactants, cationic surfactants or amphoteric surfactants.

3. The method of claim 1 where the weight ratio of nonionic surfactant to ionic surfactant ranges from about 99/1 to about 1/99.

4. The method of claim 1 where the nonionic surfactant is selected from the group consisting of alcohol ethoxylates having a straight or branched alkyl chain of from 3 to 18 carbon atoms, and from 1 to 30 ethoxy groups.

5. The method of claim 1 where the ionic surfactant is selected from the group consisting of:
   anionic surfactants selected from the group consisting of fatty carboxylates, alkyl sarcosinates, alkyl phosphates, alkyl sulfonates, alkyl sulfates, and mixtures thereof;
   cationic surfactants selected from the group consisting of monoalkyl quaternary amines, dialkyl quaternary amines, and mixtures thereof; and
   amphoteric surfactants selected from the group consisting of alkyl betaines, alkylamido propyl betaines, alkylampho acetates, alkylamphopropionates, alkylamidopropyl hydroxy sultanes, and mixtures thereof.

6. The method of claim 1 where the method recovers more liquid as compared with an identical foam-forming composition absent the nonionic surfactant.

7. A method of recovering a fluid from a gas well or a pipeline comprising:
   injecting a foam-forming composition into a well or pipeline, where the foam-forming composition comprises:
      a gas;
      at least one nonionic surfactant; and
      at least one ionic surfactant selected from the group consisting of anionic surfactants, cationic surfactants and amphoteric surfactants;
      where the weight ratio of nonionic surfactant to ionic surfactant ranges from about 99/1 to about 1/99
   creating a foam from the foam-forming composition; and
   contacting the fluid in the well or pipeline with the foam to recover the fluid,
   where the method recovers more liquid as compared with an identical foam-forming composition absent the nonionic surfactant.

8. The method of claim 7 where the at least one ionic surfactant is selected from only one type of the surfactants selected from the group consisting of anionic surfactants, cationic surfactants or amphoteric surfactants.

9. The method of claim 7 where the nonionic surfactant is selected from the group consisting of alcohol ethoxylates having a straight or branched alkyl chain of from 3 to 18 carbon atoms, and from 1 to 30 ethoxy groups.

10. The method of claim 7 where the ionic surfactant is selected from the group consisting of:
    anionic surfactants selected from the group consisting of fatty carboxylates, alkyl sarcosinates, alkyl phosphates, alkyl sulfonates, alkyl sulfates, and mixtures thereof;
    cationic surfactants selected from the group consisting of monoalkyl quaternary amines, dialkyl quaternary amines, and mixtures thereof; and
    amphoteric surfactants selected from the group consisting of alkyl betaines, alkylamido propyl betaines, alkylampho acetates, alkylamphopropionates, alkylamidopropyl hydroxy sultanes, and mixtures thereof.

11. A method of recovering a fluid from a gas well or a pipeline from a formation comprising:
    injecting a foam-forming composition into a well or pipeline, where the foam-forming composition comprises:
       a gas;
       at least one nonionic surfactant selected from the group consisting of alcohol ethoxylates having a straight or branched alkyl chain of from 3 to 18 carbon atoms, and from 1 to 30 ethoxy groups; and
       at least one ionic surfactant selected from the group consisting of:
          anionic surfactants selected from the group consisting of fatty carboxylates, alkyl sarcosinates, alkyl phosphates, alkyl sulfonates, alkyl sulfates, and mixtures thereof,
          cationic surfactants selected from the group consisting of monoalkyl quaternary amines, dialkyl quaternary amines, and mixtures thereof, and
          amphoteric surfactants selected from the group consisting of alkyl betaines, alkylamido propyl betaines, alkylampho acetates, alkylamphopropionates, alkylamidopropyl hydroxy sultanes, and mixtures thereof;
    creating a foam from the foam-forming composition; and
    contacting the fluid in the well or pipeline with the foam to recover the fluid.

12. The method of claim 11 the at least one ionic surfactant is selected from only one type of the surfactants selected from the group consisting of anionic surfactants, cationic surfactants or amphoteric surfactants.

13. The method of claim 11 where the weight ratio of nonionic surfactant to ionic surfactant ranges from about 99/1 to about 1/99.

14. The method of claim 11 where the method recovers more liquid as compared with an identical foam-forming composition absent the nonionic surfactant.

* * * * *